United States Patent
Yokoyama

(10) Patent No.: US 10,310,165 B2
(45) Date of Patent: Jun. 4, 2019

(54) IMAGE DISPLAY APPARATUS

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/703,338

(22) Filed: Sep. 13, 2017

(65) Prior Publication Data
US 2018/0088271 A1 Mar. 29, 2018

(30) Foreign Application Priority Data

Sep. 28, 2016 (JP) .................................. 2016-189255
Dec. 28, 2016 (JP) .................................. 2016-255069

(51) Int. Cl.
*G02B 27/01* (2006.01)
*F21V 8/00* (2006.01)

(52) U.S. Cl.
CPC .......... *G02B 6/0055* (2013.01); *G02B 6/003* (2013.01); *G02B 6/005* (2013.01); *G02B 27/0172* (2013.01); *G02B 2027/011* (2013.01)

(58) Field of Classification Search
CPC ...... G02B 6/0055; G02B 6/005; G02B 6/003; G02B 27/0172; G02B 2027/011
See application file for complete search history.

(56) References Cited

U.S. PATENT DOCUMENTS

| 2010/0111472 | A1* | 5/2010 | DeJong | G02B 27/0081 385/31 |
| 2011/0013245 | A1* | 1/2011 | Tanaka | G02B 26/105 359/201.2 |
| 2012/0086623 | A1* | 4/2012 | Takagi | G02B 6/0053 345/7 |
| 2012/0098734 | A1* | 4/2012 | Totani | G02B 27/0172 345/7 |
| 2012/0206817 | A1* | 8/2012 | Totani | G02B 27/0172 359/633 |

FOREIGN PATENT DOCUMENTS

| JP | 2016-042136 A | 3/2016 |
| WO | 2016/027442 A1 | 2/2016 |

* cited by examiner

Primary Examiner — Evan P Dzierzynski
(74) Attorney, Agent, or Firm — Oliff PLC

(57) ABSTRACT

An image display apparatus includes an image display device configured to emit image light, a light guide member, a projection lens configured to project the image light toward the light guide member, and a light extracting unit provided on the light guide member, the light extracting unit being configured to extract the image light guided in the light guide member toward an exit pupil. The light extracting unit includes a first edge located at an end portion of the light extracting unit on the light incident section side and a second edge located at an end portion on the opposite side, and is capable of transmitting see-through light having been transmitted in the light guide member toward the exit pupil, and at least one of the first edge and the second edge is located outside a see-through visual field range in which the see-through light passes through.

17 Claims, 12 Drawing Sheets

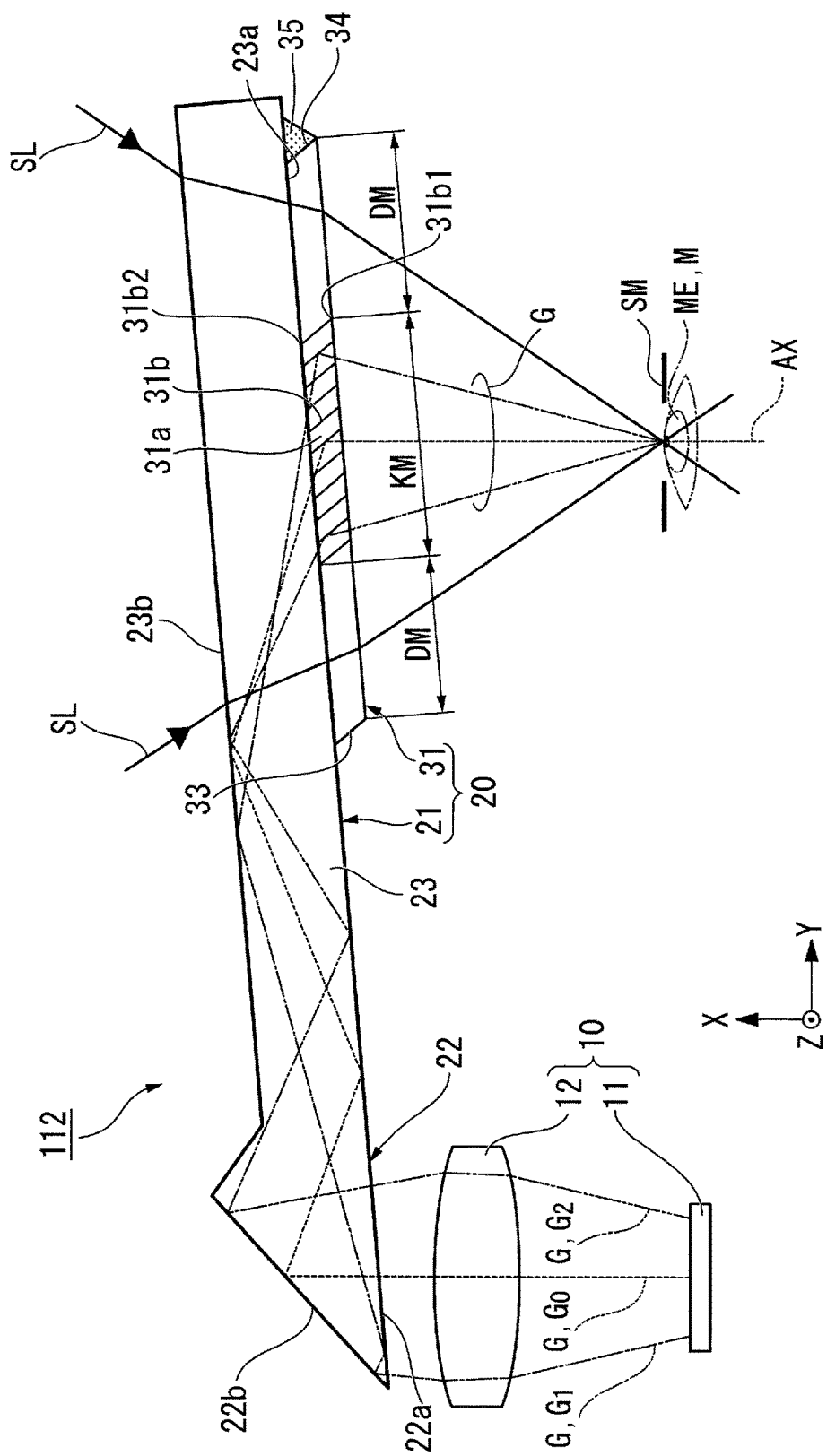

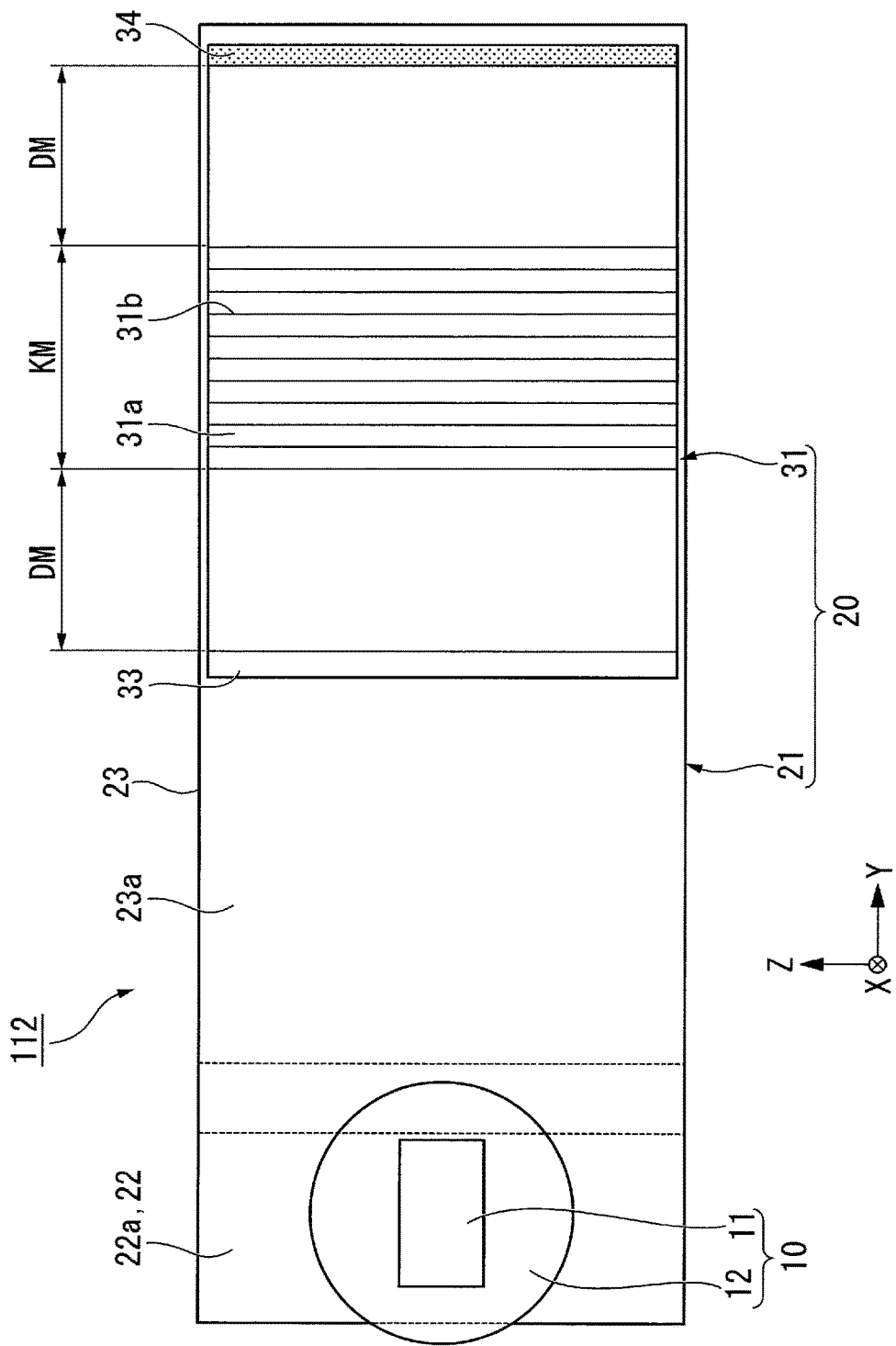

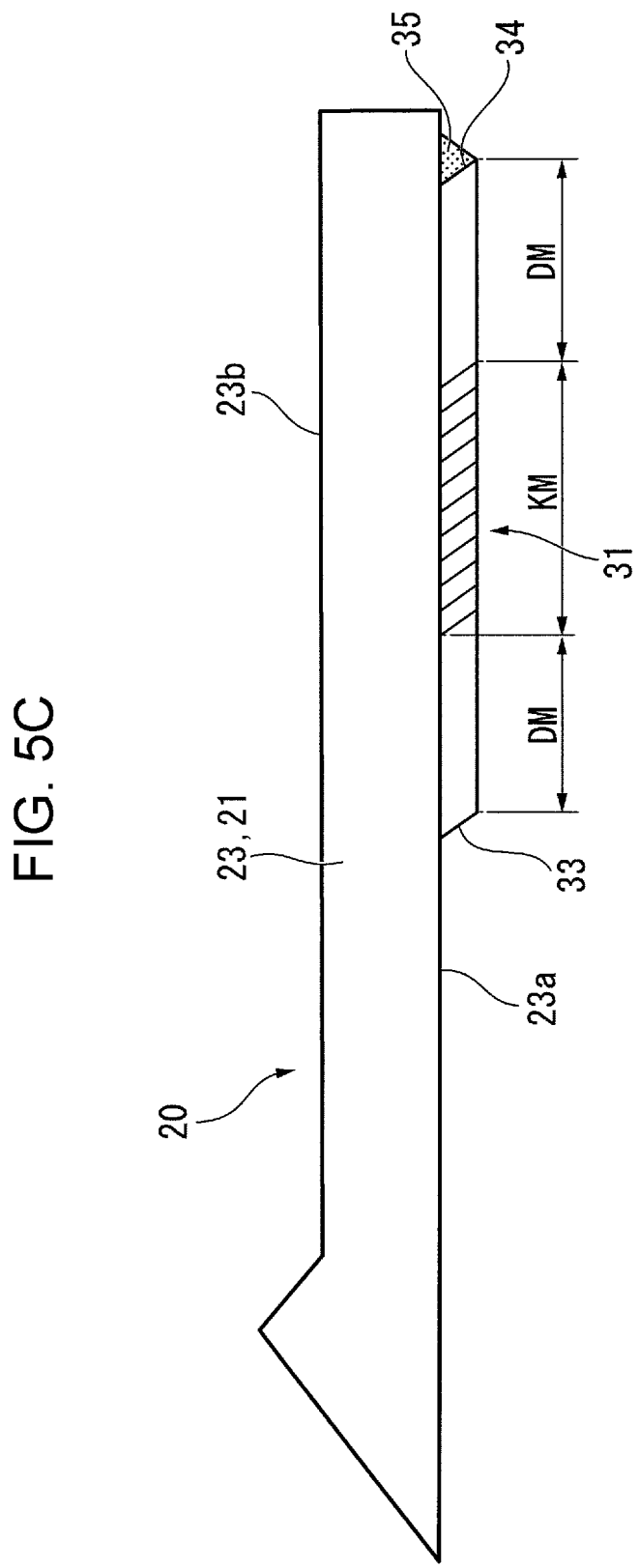

IMAGE DISPLAY APPARATUS

BACKGROUND

1. Technical Field

The present disclosure relates to an image display apparatus.

2. Related Art

See-through image display apparatuses that enable formation and observation of virtual images such as head-mounted displays have been developed in recent years. Among these apparatuses, see-through image display apparatuses that guide image light from a display element to the pupil of an observer by a light guide plate have been known (for example, see JP-A-2016-42136). Such an image display apparatus transmits the light guided through the light guide plate by a half mirror array that is provided on a surface of the light guide plate and guides the light to an observer's eye.

In such a structure, however, if an edge portion of the half mirror array is located within the field range of the see-through light, the edge portion interferes with the see-through image and the see-through image is distorted.

SUMMARY

An advantage of some aspects of the embodiment is that there is provided an image display apparatus that enables a user to visually recognize a less distorted see-through image.

According to a first aspect of the embodiment, an image display apparatus includes an image display device configured to emit image light, a light guide member having a first plane and a second plane opposite to the first plane, a projection lens configured to project the image light toward a light incident section of the light guide member, and a light extracting unit provided on the first plane or the second plane of the light guide member, the light extracting unit being configured to extract the image light guided in the light guide member toward an exit pupil located on the first plane side of the light guide member. The light extracting unit includes a first edge located at an end portion of the light extracting unit on the light incident section side and a second edge located at an end portion on the opposite side of the light incident section side, and is capable of transmitting see-through light having been transmitted in the light guide member from the second plane side to the first plane side toward the exit pupil, and at least one of the first edge and the second edge is located outside a see-through visual field range in which the see-through light passes through.

In the image display apparatus according to the first aspect, at least one of the first edge and the second edge is located outside a see-through visual field range, and a user can visually recognize see-through light without distortion.

In the first aspect, it is preferable that the light extracting unit be provided on the first plane of the light guide member. The width of the see-through visual field range becomes wider on the second plane, which is the light incident side, than on the first plane. By employing this structure, the light extracting unit is provided on the first plane and the light extracting unit can be reduced in size compared with a case in which the light extracting unit is located on the side of the second plane.

In the first aspect, it is preferable that if the diameter of the exit pupil is D, the distance from the exit pupil to the light extracting unit is Er, the see-through viewing half-angle defining the angle defined by the optical axis passing through the center of the exit pupil and the see-through visual field range is $\theta s$, and the distance from the optical axis to the first edge or the second edge is L, $L > Er \cdot \tan(\theta s) + D/2$ be satisfied. With this structure, at least one of the first edge and the second edge can be located outside the see-through visual field range.

In the first aspect, it is preferable that the see-through viewing half-angle be set to 30 degrees or greater. This structure provides balanced virtual image, which is formed by the image light, and see-through light (external image) within the field of view of an observer, and thereby the observer can visually recognize the images with less discomfort.

In the first aspect, it is preferable that the light extracting unit be provided with a half mirror array including a plurality of half mirrors, and the half mirrors be disposed such that individual inclination angles with respect to the first plane or the second plane of the light guide member are substantially the same. With this structure, the image light can be extracted toward the exit pupil while the angle of view of the image light is maintained.

In the first aspect, it is preferable that the half mirror array have a dummy region in which the half mirrors are not provided between the first edge or the second edge and the half mirror array. With this structure, the dummy region is provided and the dummy region enables the adjustment of the position of the edge without increasing the number of half mirrors, and thereby the cost of the light extracting unit can be reduced.

In the first aspect, it is preferable that the half mirror array be formed such that the first edge, the second edge, and the half mirrors are parallel to each other. This structure facilitates the manufacture of the light extracting unit.

In the first aspect, it is preferable that the first edge be provided in a forward tapered state and the second edge be provided in a reverse tapered state with respect to the first plane or the second plane of the light guide member. This structure facilitates the manufacture of the light extracting unit.

In the first aspect, it is preferable that a resin be filled between the second edge and the first plane or the second plane of the light guide member. With this structure, it is possible to provide the light extracting unit that reduces the occurrence of light scattering due to the exposed acute edge and also reduces safety problems caused by the acute edge, for example, hand injury caused by the edge.

In the first aspect, it is preferable that the light extracting unit be a diffractive optical element. With this structure, the image light can be efficiently extracted by using diffraction of light.

In the first aspect, it is preferable that the see-through visual field range be an effective visual field range enabling an observer to recognize at least the see-through light while moving the line of sight. With this structure, at least one of the first edge and the second edge can be located outside the effective visual field range.

In the first aspect, it is preferable that an effective viewing half-angle that defines an angle to be formed by the optical axis passing through the center of the exit pupil and the effective visual field range is set to 20 degrees or greater. With this structure, an observer can recognize predetermined information such as characters and images while moving the line of sight and can recognize naturally a virtual image formed by the image light and see-through light (external image).

In the first aspect, it is preferable that, when an image display range defining an angle of view for guiding the image light toward the exit pupil is wider than the effective visual field range, at least one of the first edge and the second edge be located outside the image display range. This structure prevents overlapping of at least one of the first edge and the second edge with the image light, and thereby the observer can visually recognize a high-quality image.

According to a second aspect of the embodiment, an image display apparatus includes an image display device configured to emit image light, a light guide member having a first plane and a second plane opposite to the first plane, a projection lens configured to project the image light toward a light incident section of the light guide member, and a light extracting unit provided on the light guide member, the light extracting unit being configured to extract the image light guided in the light guide member toward an exit pupil located on the side of one of the planes of the light guide member. The light guide member has an end plane located at an end portion on the opposite side of the light incident section side, the light extracting unit is capable of transmitting see-through light having been transmitted in the light guide member from the second plane side to the first plane side toward the exit pupil, and the end plane of the light guide member is located outside the see-through visual field range in which the see-through light passes through.

In the image display apparatus according to the second aspect, the end plane of the light guide plate is located outside a see-through visual field range, and the observer can visually recognize see-through light without distortion.

BRIEF DESCRIPTION OF THE DRAWINGS

The embodiment will be described with reference to the accompanying drawings, wherein like numbers reference like elements.

FIG. 3 is a horizontal sectional view illustrating a schematic configuration of an image display section.

FIG. 4 is a front view of the image display section viewed from the back side.

FIG. 5C illustrates a method of manufacturing the light extracting unit.

DESCRIPTION OF EXEMPLARY EMBODIMENTS

Figure 1:
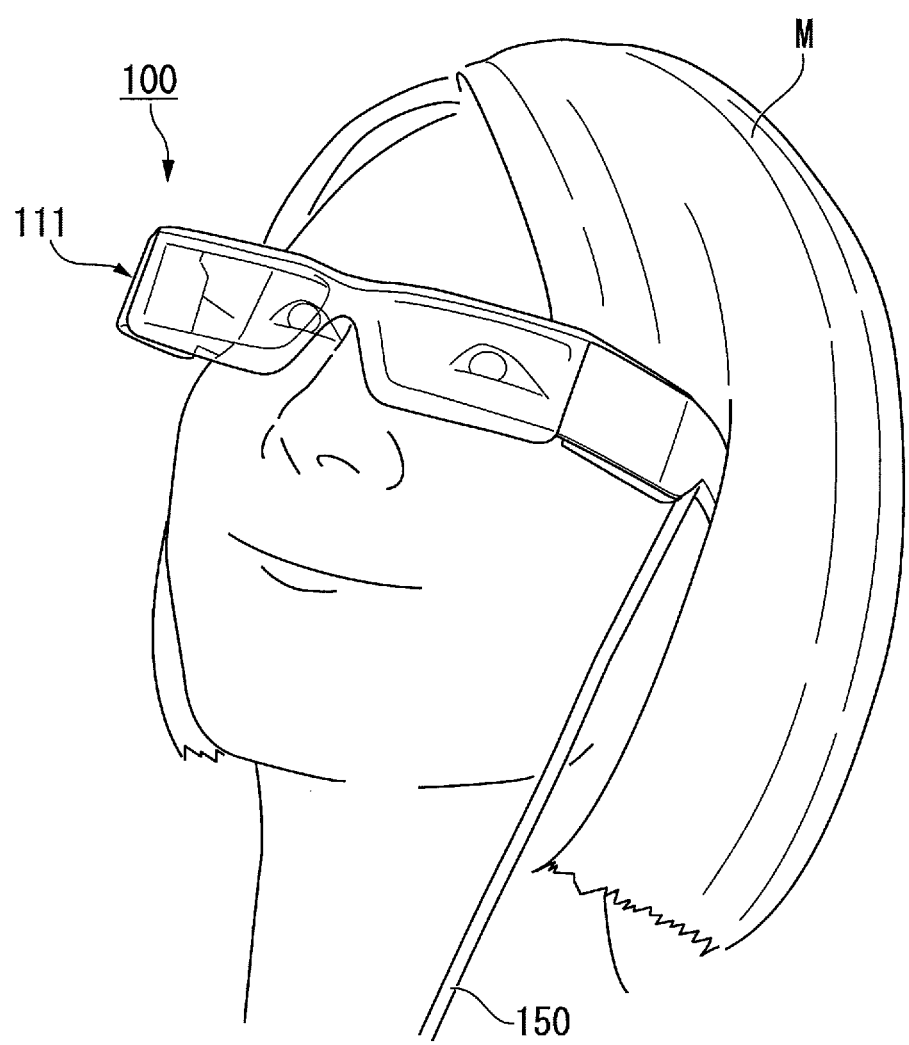
FIG. 1 illustrates an image display apparatus according to a first embodiment mounted on an observer.

Embodiments will be described in detail with reference to the accompanying drawings. In the drawings used in the following description, in order to facilitate the understanding of features, feature points may be enlarged for convenience, and the dimensional ratio of each component may be different from that of actual ratio.

First Embodiment

An image display apparatus according to the embodiment is a see-through type head-mounted display that can see an exterior together with an image. In other words, the image display apparatus enables an observer to recognize an image as a virtual image while enabling the observer to observe an external image as see-through light.

Figure 2:
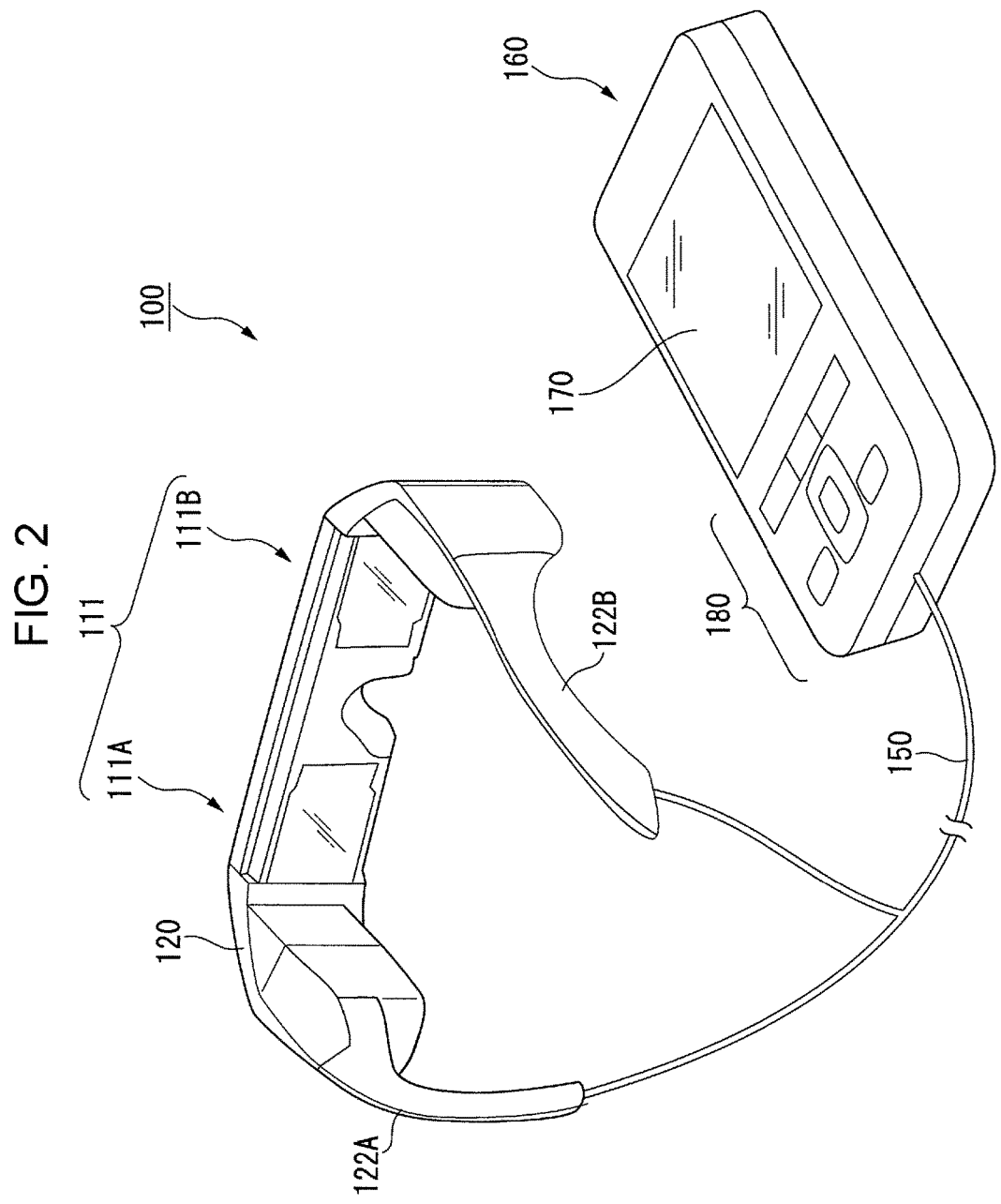
FIG. 2 is a perspective view of the image display apparatus according to the first embodiment.

FIG. 1 illustrates the image display apparatus according to the embodiment that is mounted on an observer. FIG. 2 is a perspective view of the image display apparatus according to the embodiment.

As illustrated in FIG. 1, an image display apparatus 100 according to the embodiment is used by an observer M by mounting the image display apparatus 100 on the head as if the observer M is wearing glasses. As illustrated in FIG. 2, the image display apparatus 100 includes a display section 111 of a shape similar to glasses, and a control device (controller) 160 of a size an observer can hold with hand. The display section 111 and the control device 160 are wired or wirelessly connected so as to communicate with each other. In this embodiment, each of a left-eye image display section 111A and a right-eye image display section 111B, which are included in the display section 111, is connected to the control device 160 via a cable 150 so as to be able to communicate with each other, for example, to send and/or receive image signals, control signals, or the like.

The display section 111 includes a main frame 120, the left-eye image display section 111A, and the right-eye image display section 111B. The control device 160 includes a display screen section 170 and an operation button section 180.

The display screen section 170 displays, for example, various kinds of information, instructions, and the like to be provided for an observer. The main frame 120 includes a pair of temple sections 122A and 122B for an observer to wear on the ears. The main frame 120 is a member that supports the left-eye image display section 111A and the right-eye image display section 111B.

The right-eye image display section 111B and the left-eye image display section 111A have similar structures, and the components in both display sections 111 are symmetrically disposed. Accordingly, in the following description, the left-eye image display section 111A is simply referred to as an image display section 112 and will be described in detail, and the description of the right-eye image display section 111B is omitted.

Hereinafter, an XYZ coordinate system is used in the drawings. An X direction corresponds to a front-back direction of an observer who wears the image display apparatus, a Y direction corresponds to a left-right direction of the observer, and a Z direction is orthogonal to the X direction and the Y direction and corresponds to an up-down direction of the observer. In this embodiment, a −Y direction may be referred to as a left direction (left side), a +Y direction may be referred to as a right direction (right side), a +X direction may be referred to as a front direction (front or front side), and a −X direction may be referred to as a back direction (back or back side).

FIG. 3 is a horizontal sectional view illustrating a schematic structure of the image display section 112. The cross section illustrated in FIG. 3 is parallel to the XY plane. FIG. 4 is a front view of the image display section 112 viewed from the back side. As illustrated in FIG. 3 and FIG. 4, the image display section 112 includes an image forming section 10 and a light guide section 20. The image forming section 10 includes an image display panel 11 and a projection lens 12. The image display panel 11 is an image display device such as a liquid crystal display panel or organic electroluminescent (EL) panel. The projection lens 12 projects image light G displayed by the image display panel 11 toward a light incident section 22 in the light guide section 20. The projection lens 12 is made of glass or plastic and the number of the lenses is not limited to one and it may be composed of a plurality of lenses.

The light guide section 20 transmits external light that corresponds to an external image as see-through light SL while guiding the image light G, which has been projected by the image forming section 10, as virtual image light toward an eye ME of the observer M. The light guide section 20 includes a light guide member 21 and a light extracting unit 31 that extracts the image light G that has been guided in the light guide member 21 to the outside.

The light guide member 21 includes a light incident section 22 that allows the image light G to enter the light guide member 21 and a parallel light guide plate 23, which are integrally formed of a resin material having a high light transmittance.

The light incident section 22 has a triangular prism shape and has a light incident plane 22a that allows the image light G from the projection lens 12 to enter the light guide member 21 and a reflecting section 22b that reflects the incident image light G to guide the image light G into the parallel light guide plate 23. The reflecting section 22b is formed by forming an aluminum evaporated film on the prism-shaped surface. The reflecting section 22b reflects the incident image light G to bend the optical path in a direction close to the orthogonal direction. By the reflecting section 22b, the image light G incident from the light incident section 22 enters the parallel light guide plate 23.

Here, an optical axis AX is set as an axis that passes through the center of an exit pupil SM. The exit pupil SM is located in the optical design at a position the eye ME of the observer M is positioned when the observer M wears the image display apparatus 100.

The parallel light guide plate 23 has a plate-like shape and extends in the left-right direction (Y direction in which both eyes are positioned) of the observer M. Specifically, the parallel light guide plate 23 is disposed slightly inclined with respect to the optical axis AX, which passes through the center of the exit pupil SM. The parallel light guide plate 23 is inclined in the backward direction (−X direction) with respect to the left side (−Y direction) of the observer M, that is, such that the parallel light guide plate 23 comes closer to the face.

In such a layout, the parallel light guide plate 23 is disposed along the curve of the face of the observer M, and this enables the image display section 112 including the light guide member 21 to be provided along the curve of the face. This structure enables the image display apparatus 100 including the image display section 112 to be provided in an excellent design.

The parallel light guide plate 23 has a pair of parallel first plane 23a and second plane 23b. Since the first plane 23a and the second plane 23b are parallel planes, no magnification or focus deviation is produced with respect to an external image.

The first plane 23a and the second plane 23b function as total reflection planes that totally reflect the image light G that is transmitted inside the parallel light guide plate 23 and are designed to guide the image light G to the light extracting unit 31 with less loss. In this embodiment, the first plane 23a and the light incident plane 22a form a continuous plane.

The image light G that has entered the parallel light guide plate 23 reaches the first plane 23a and is totally reflected by the first plane 23a. Then, the image light G reaches the second plane 23b and is totally reflected by the second plane 23b. The image light G is totally reflected one or more times between the first plane 23a and the second plane 23b in the direction separating from the light incident section 22 and reaches the light extracting unit 31.

The light extracting unit 31 is provided on the first plane 23a of the parallel light guide plate 23 and is used to extract the image light G that has passed through the parallel light guide plate 23 toward the exit pupil SM. The exit pupil SM is located on the side of the first plane 23a of the parallel light guide plate 23. The light extracting unit 31 is designed to satisfy predetermined conditions. These design conditions will be described below.

The light extracting unit 31 is optically bonded to the first plane 23a of the parallel light guide plate 23. The light extracting unit 31 is a plate-like member that extends along the first plane 23a of the parallel light guide plate 23 in the Y direction.

As illustrated in FIG. 3, the light extracting unit 31 includes a transparent member 31a and a plurality of half mirrors 31b that are embedded in the transparent member 31a. The refractive index of the transparent member 31a is substantially the same as the refractive index of the parallel light guide plate 23. This structure reduces the reflection of the image light G on the interface between the light extracting unit 31 and the parallel light guide plate 23.

In this embodiment, the light extracting unit 31 includes a half-mirror formed region KM in which the half mirrors 31b are formed and dummy regions DM in which the half mirrors 31b are not formed. In other words, the half-mirror formed region KM is a region that includes the transparent member 31a and the half-mirrors 31b, and the dummy region DM is a region that includes only the transparent member 31a. The effects of the dummy region DM will be described below.

The plurality of half mirrors 31b are long in the Z direction and arranged at a predetermined pitch in the transparent member 31a. Each of the plurality of half mirrors 31b is disposed such that a front end portion 31b 2 is inclined so as to be closer to the side of the light incident section 22 (−Y side) than a back end portion 31b 1 with respect to the first plane 23a of the parallel light guide plate 23. The half mirrors 31b are disposed such that their inclination angles with respect to the first plane 23a are substantially the same. In other words, the half mirrors 31b are arranged in parallel to each other.

In the light extracting unit 31, a first edge 33 and a second edge 34 of the light extracting unit 31 and the half mirrors 31b are provided in parallel to each other. This structure facilitates the manufacture of the light extracting unit 31 as will be described below.

In this embodiment, the light extracting unit 31 has the first edge 33 and the second edge 34 at both sides in the left-right direction. The first edge 33 is an end portion on the light incident section 22 side (−Y side) and the second edge 34 is an end portion on the opposite side (+Y side) of the light incident section 22 side.

The first edge 33 is provided in a forward tapered state with respect to the first plane 23a and the second edge 34 is provided in a reverse tapered state with respect to the first plane 23a. The forward tapered state is a state in which the inclination angle with respect to the first plane 23a is an obtuse angle and the reverse tapered state is a state in which the inclination angle with respect to the first plane 23a is an acute angle.

Although the acute edge of the reverse-tapered second edge 34 is exposed, in this embodiment, the second edge 34 is filled with an optical resin 35. This structure reduces the occurrence of light scattering due to the exposed acute edge, and also reduces safety problems caused by the acute edge, for example, hand injury caused by the edge.

It is preferable that the refractive index of the optical resin 35 be close to that of the glass in the light extracting unit 31. Alternatively, a black resin that absorbs light and does not produce unnecessary scattered light may be used.

As described above, the light extracting unit 31 includes the transparent member 31a and the half mirrors 31b. Accordingly, the light extracting unit 31 transmits the light that has been transmitted from the second plane 23b side of the parallel light guide plate 23 to the first plane 23a side toward the exit pupil SM. In other words, the observer M can observe an external image as see-through light SL via the light extracting unit 31 and the light guide section 20.

Figure 5A:
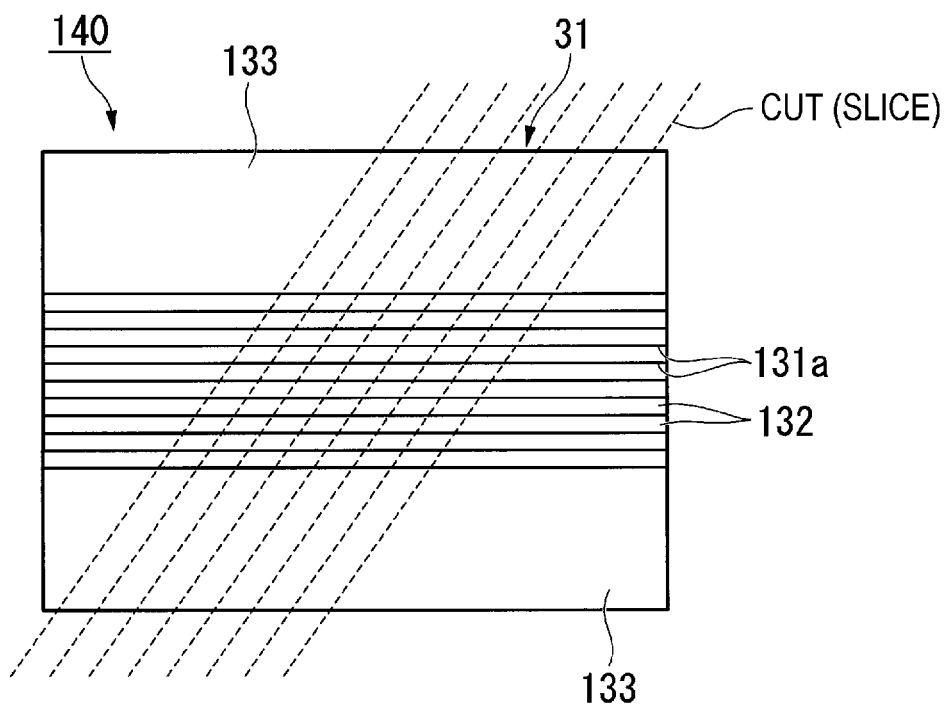
FIG. 5A illustrates a method of manufacturing a light extracting unit.
Figure 5B:
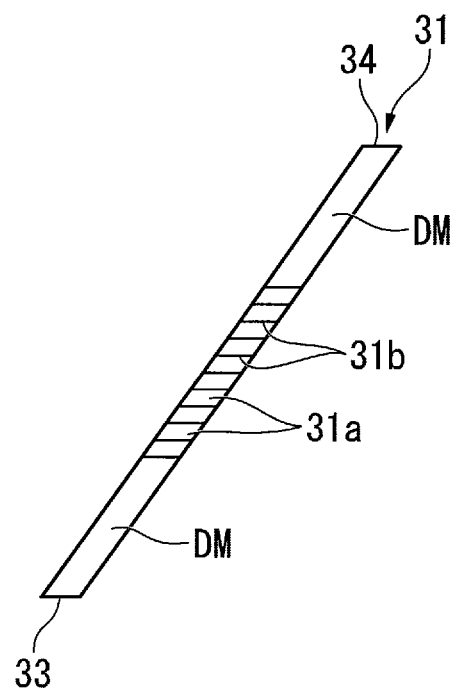
FIG. 5B illustrates a method of manufacturing the light extracting unit.

Next, an example method of manufacturing the light extracting unit 31 that has the above-described structure will be described. FIGS. 5A to 5C illustrate a method of manufacturing the light extracting unit 31.

As illustrated in FIG. 5A, glass plates 132, on each of which a large size half mirror 131a is formed, are laminated and both sides of the laminate are sandwiched by glass blocks 133 to form a laminate 140. The laminate 140 is formed by optically bonding each of the glass plates 132 and the glass blocks 133.

The laminate 140 is sliced (cut) with a predetermined thickness to cut out a plurality of light extracting units 31 as indicated by the broken lines in FIG. 5A. By cutting the glass plates 132 and glass blocks 133, the transparent members 31a are formed, and by cutting the large size half mirrors 131a, the half mirrors 31b are formed.

In cutting the laminate 140 into individual pieces, each piece is sliced (cut) such that each half mirror 31b has a predetermined inclination angle with respect to the first plane 23a of the parallel light guide plate 23 and each light extracting unit 31 has a predetermined thickness. Then, both planes are polished.

The light extracting unit 31 that is cut out as described above has a plate-like shape as illustrated in FIG. 5B, and the first edge 33 and the second edge 34 that are formed at both ends thereof are planes parallel to the half mirrors 31b.

Each portion corresponding to the glass block 133 is the dummy region DM in which no half mirrors 31b are formed in the light extracting unit 31. In other words, the size of the dummy region DM can be appropriately adjusted by the thickness of the glass block 133.

Then, the light extracting unit 31 is optically bonded to the first plane 23a of the parallel light guide plate 23 as illustrated in FIG. 5C. Then, the acute edge of the second edge 34, which is reversely tapered with respect to the first plane 23a, is filled with the optical resin (filling resin) 35.

This structure reduces the occurrence of light scattering due to the exposed acute edge, and also reduces safety problems caused by the acute edge, for example, hand injury caused by the edge. According to the above-described method, the light guide section 20 including the light guide member 21 and the light extracting unit 31 can be formed.

Figure 6:
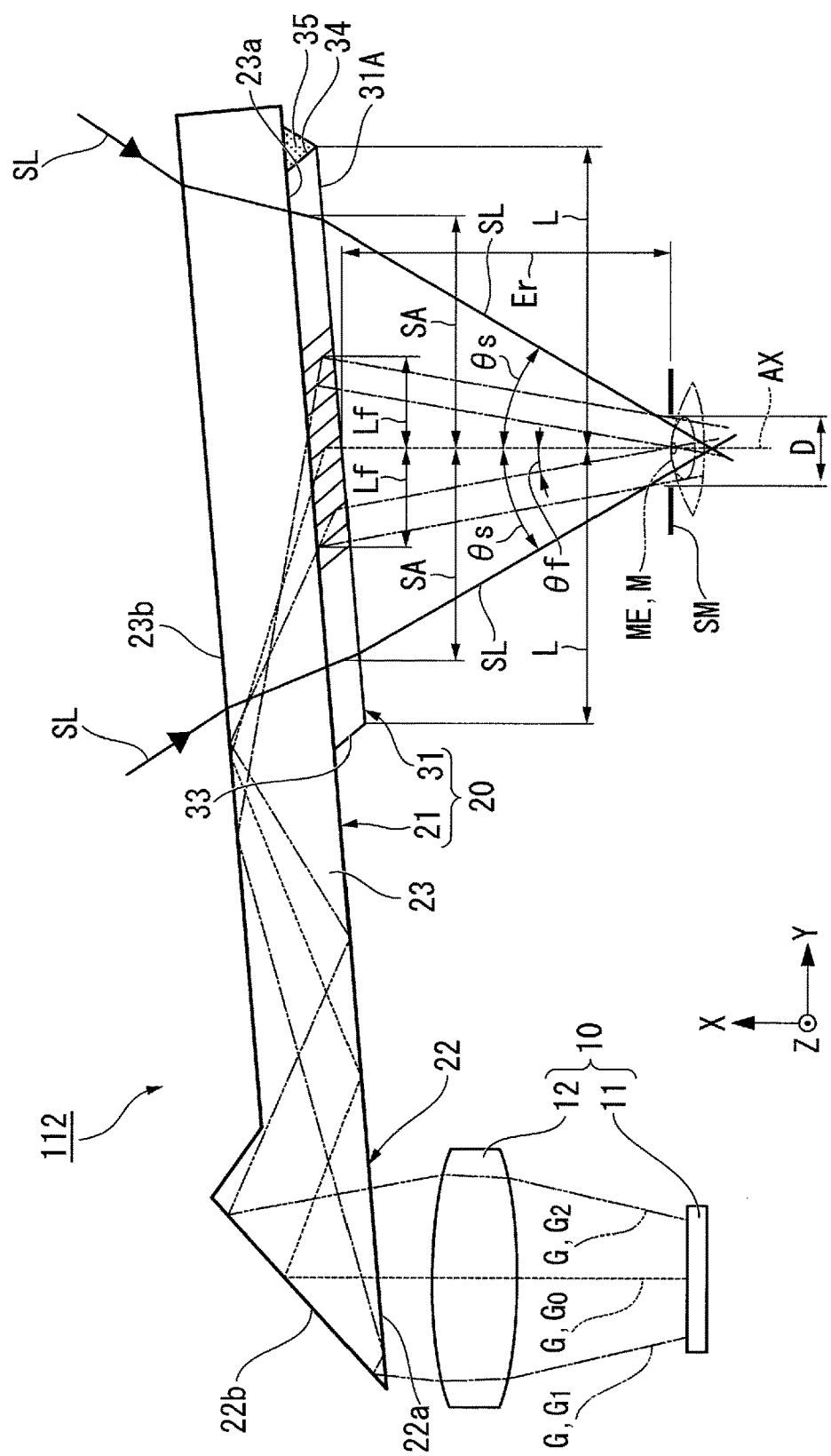
FIG. 6 illustrates an optical path of image light directed toward an eye of an observer.

With reference to FIG. 6, an optical path of the image light G that is produced in the image forming section and enters the eye ME of the observer M will be described.

In FIG. 6, among the image light G emitted from the image display panel 11, a component emitted from a central portion indicated by the broken line is image light $G_0$, a component emitted from a leftmost end on the left side in the surroundings indicated by the alternate long and short dashed line in FIG. 6 is image light $G_1$, and a component emitted from a rightmost end on the right side in the surroundings indicated by the chain double-dashed line in FIG. 6 is image light $G_2$. The image light $G_0$, $G_1$, and $G_2$ is a part of the entire image light G, and other light components constituting the image light G are guided similarly to the image light $G_0$ and other components and emitted from a light exit plane 31A. Consequently, their illustrations and descriptions are omitted.

Each of the image light $G_0$, $G_1$, and $G_2$ that has passed through the projection lens 12 enters from the light incident section 22 (light incident plane 22a) of the light guide section 20 onto the reflecting section 22b and passes through in the parallel light guide plate 23 to the light extracting unit 31.

The incident angle at which the image light G enters the light extracting unit 31 increases with the distance from the light incident section 22. In other words, on the right side (the side far from the light incident section 22) of the light extracting unit 31, the image light G enters with a large inclination with respect to the optical axis AX and the image light G is bent at a relatively small angle, and on the left side (the side close to the light incident section 22) of the light extracting unit 31, the image light G enters with a small inclination with respect to the optical axis AX and the image light G is bent at a relatively large angle.

Specifically, the image light $G_0$ enters the central portion of the light extracting unit 31 without being reflected at the interface between the first plane 23a of the parallel light guide plate 23 and the light extracting unit 31. The image light $G_0$ is reflected by the half mirror 31b at a predetermined angle and emitted as a parallel light flux from the light exit plane 31A toward the exit pupil SM along the optical axis AX direction that is inclined by a predetermined angle with respect to the plane including the light exit plane 31A.

The image light $G_1$ enters the right side (+Y side) of the light extracting unit 31 without being reflected at the interface between the first plane 23a of the parallel light guide plate 23 and the light extracting unit 31. The image light $G_1$ is reflected by the half mirror 31b at an angle smaller than that of the image light $G_0$ and emitted as a parallel light flux from the light exit plane 31A toward the exit pupil SM.

Similarly, the image light $G_2$ enters the left side (−Y side) of the light extracting unit 31 without being reflected at the interface between the parallel light guide plate 23 and the light extracting unit 31. The image light $G_2$ is reflected by the half mirror 31b at an angle larger than that of the image light $G_O$ and emitted as a parallel light flux from the light exit plane 31A toward the exit pupil SM.

As described above, the image light G that has entered the light extracting unit 31 is bent at designed angles such that the image light G can be extracted toward the exit pupil SM and finally enters the eye ME of the observer M positioned at the exit pupil SM. The image light G emitted from the light extracting unit 31 enters the eye ME of the observer M as virtual image light and the virtual image light forms an image on the retina of the observer M, and thereby the observer M can recognize the image formed by the virtual image.

Furthermore, the image display apparatus 100 according to the embodiment enables the observer M to observe an external image as see-through light SL. In the following description, in the image display apparatus 100, a range (a range in which an external image can be visually recognized) in which see-through light SL is allowed to enter the eye ME (exit pupil SM) of the observer M is referred to as a see-through visual field range.

The light extracting unit 31 includes the first edge 33 and the second edge 34 at respective ends in the left-right direction. If the first edge 33 or the second edge 34 exists within the see-through visual field range, an image formed by the see-through light is distorted and the observer M is prevented from satisfactorily recognizing the see-through light SL (external image).

To solve the problem, in the image display apparatus 100 according to the embodiment, the edges (the first edge 33 and the second edge 34) of the light extracting unit 31 are disposed so as not to be in the see-through visual field range to enable the observer M to satisfactorily recognize the see-through light SL. Hereinafter, a positional relationship between the see-through visual field range and the edges of the light extracting unit 31 will be described.

In FIG. 6, it is defined that the diameter of the exit pupil SM is D, the distance (referred to as an eye relief) between the exit pupil SM and the light extracting unit 31 along the optical axis AX is Er, the see-through viewing half-angle (the angle defined by the optical axis AX and a see-through visual field range SA) is θs, the distance from the optical axis AX to each of the edges (the first edge 33 and the second edge 34) of the light extracting unit 31 is L, and the image display range that defines the angle of view necessary for displaying the image light G (virtual image) is Lf.

In the light extracting unit 31 according to the embodiment, the following expression (1) that defines a condition that the distance L becomes larger than the see-through visual field range SA is satisfied.

$$L > SA = Er \cdot \tan(\theta s) + D/2 \quad \text{expression (1).}$$

The half-mirror formed region KM corresponds to the image display range Lf in the image display apparatus 100 according to the embodiment. The dummy regions DM are provided outside the half-mirror formed region KM such that the edges (the first edge 33 and the second edge 34) of the light extracting unit 31 are located outside the image display ranges Lf and the see-through visual field ranges SA.

The dummy regions DM enable the adjustment of the first edge 33 and the second edge 34 without increasing the number of half mirrors 31b, and thereby the cost of the light extracting unit 31 can be reduced.

In this embodiment, it is preferable that the see-through viewing half-angle θs be 30 degrees or greater. The see-through viewing half-angle θs set in this range provides balanced virtual image, which is formed by the image light G, and see-through light (external image) within the field of view of the observer M, and thereby the observer M can visually recognize the images with less discomfort.

Specifically, if the diameter D of the exit pupil SM is 8 mm, the eye relief Er is 20 mm, and the see-through viewing half-angle θs is 45 degrees, the see-through visual field range SA is 24 mm. Consequently, in this embodiment, the edges (the first edge 33 and the second edge 34) of the light extracting unit 31 are located at positions separated from the optical axis AX by 24 mm or greater.

If an image half angle θf for determining the size of a visible virtual image formed by the image light G is 10 degrees, the image display range Lf is about 7.5 mm. Although the half-mirror formed region KM is slightly larger than 7.5 mm, the regions from the half mirrors 31b on the outermost sides to the see-through visual field ranges SA=24 mm correspond to the dummy regions DM in which no half mirrors 31b are provided.

As described above, in the image display section 112 according to the embodiment, the first edge 33 and the second edge 34 of the light extracting unit 31 are located outside the see-through visual field range SA. With this structure, the image display apparatus 100 according to the embodiment including such an image display section 112 enables the observer M to visually recognize the see-through light (external image) without distortion.

It should be noted that depending on the layout of the components constituting the image display section 112, both of the first edge 33 and the second edge 34 may not be located outside the see-through visual field range SA. In such a case, at least one of the first edge 33 and the second edge 34 is located outside the see-through visual field range SA, and thereby the light extracting unit 31 enables the observer M to visually recognize see-through light with less distortion.

In the light extracting unit 31 according to the embodiment, the half mirrors 31b are selectively provided in the image display range Lf in which the image light G necessary for image display is allowed to be transmitted. This structure reduces the process of forming the half mirrors 31b and reduces the cost.

Furthermore, the image display section 112 according to the embodiment has the light extracting unit 31 provided on the side of the first plane 23a of the parallel light guide plate 23. As described above, the light extracting unit 31 is set such that the first edge 33 and the second edge 34 are outside the see-through visual field range SA. As illustrated in FIG. 6, the width of the see-through visual field range SA is wider on the second plane 23b, which is the light incident side, than on the first plane 23a. Accordingly, since this embodiment provides the light extracting unit 31 on the first plane 23a, the size of the light extracting unit 31 can be reduced compared with a case in which the light extracting unit 31 is disposed on the side of the second plane 23b.

Second Embodiment

An image display section according to a second embodiment will be described. The same reference numerals are given to components similar to those in the first embodiment, and their detailed descriptions will be omitted.

Figure 7:
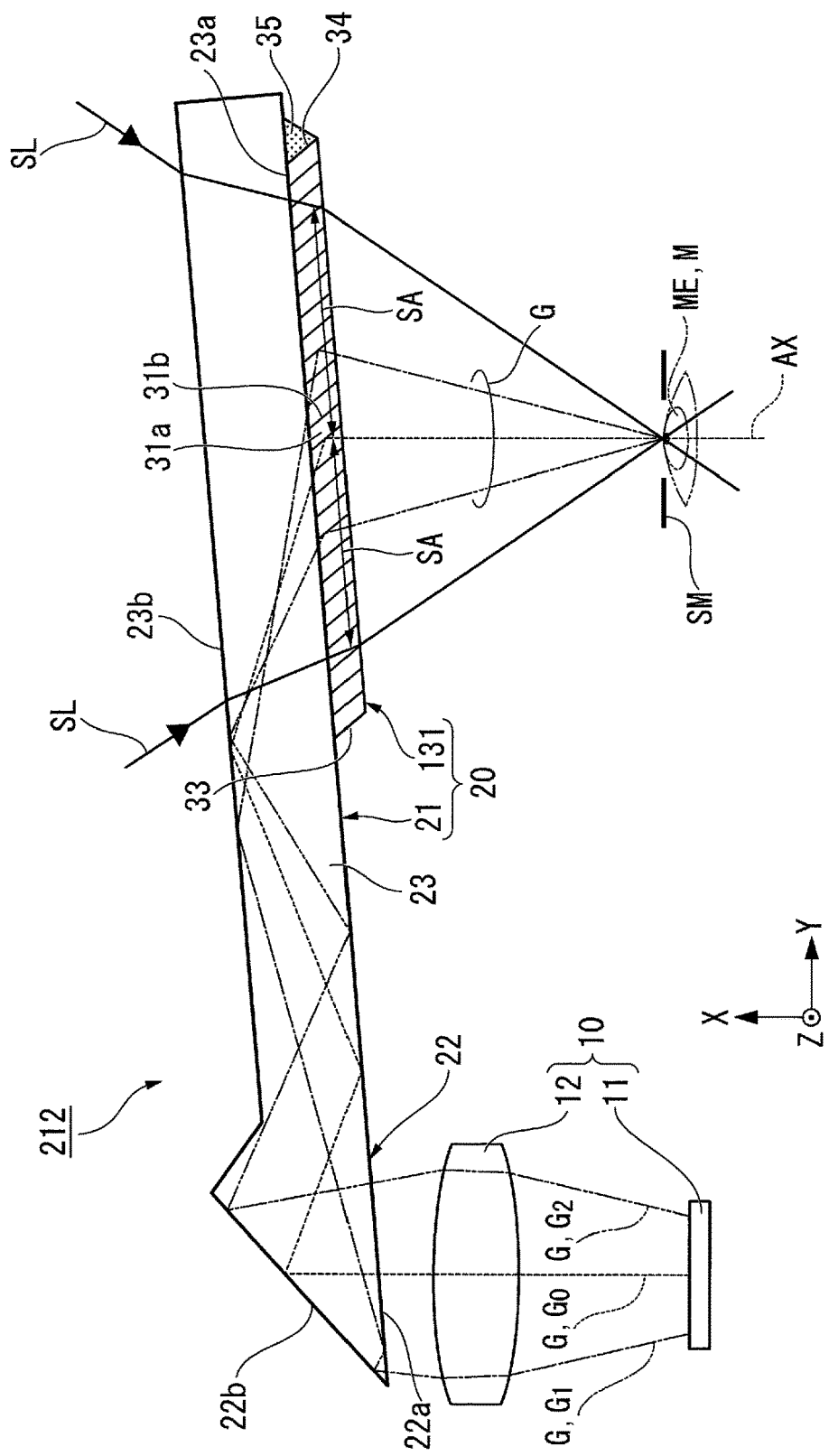
FIG. 7 is a cross-sectional view illustrating a structure of an image display section according to a second embodiment.

FIG. 7 is a cross-sectional view illustrating a structure of an image display section 212 according to the second embodiment. The image display section 212 according to the embodiment is provided with a light extracting unit 131 that is different from the light extracting unit according to the first embodiment, and the other components are the same.

Accordingly, in the following description, a structure of the light extracting unit 131 will be described mainly.

As illustrated in FIG. 7, the light extracting unit 131 according to the embodiment is not provided with the dummy regions DM (see FIG. 4). In other words, in the light extracting unit 131, the half mirrors 31*b* are formed not only in the image display range Lf, in which the image light G necessary for displaying image is allowed to transmit, but also in the vicinity of the first edge 33 and the second edge 34.

In the light extracting unit 31 according to the first embodiment, in the see-through visual field range SA, there are boundaries between the region (half-mirror formed region KM) in which the half mirrors 31*b* are formed and the regions (dummy regions DM) in which the half mirrors 31*b* are not formed, and this boundaries may cause interference during the observation of the see-through light SL.

In this embodiment, although not contributing to image display, the half mirrors 31*b* are formed to both edges (the first edge 33 and the second edge 34) of the light extracting unit 131 in order to eliminate the boundaries between the region in which the half mirrors 31*b* are formed and the regions in which no half mirrors 31*b* are formed in the see-through visual field range SA. Consequently, the viewability of images formed by the see-through light SL can be increased.

It is to be understood that the disclosure is not limited to the above-described embodiments, various modifications can be made within the scope of the disclosure.

For example, in the above-described embodiments, the half mirror array is used as the light extracting unit 31. However, the disclosure is not limited to this embodiment. The light extracting unit may be, for example, a diffractive optical element such as a diffraction grating, a volume holographic element, or the like.

In the above-described embodiments, the light extracting unit 31 is located on the side of the first plane 23*a* (on the side of the observer M) of the parallel light guide plate 23; alternatively, the light extracting unit 31 may be located on the side of the second plane 23*b* of the parallel light guide plate 23. In such a case, at least one of the first edge 33 and the second edge 34 may be located outside the see-through visual field range SA.

In the above-described embodiments, the see-through visual field range SA is wider than the image display range Lf. However, the disclosure is not limited to this embodiments. For example, the angle of view may be set to a large angle in accordance with the specification of the image display apparatus. In such a case, the image display range Lf may be wider than the see-through visual field range SA.

When the image display range Lf is wider than the see-through visual field range SA, it is preferable that at least one of the first edge 33 and the second edge 34 be located outside the image display range Lf.

If it is assumed that an observer does not move the line of sight, in the image display range Lf, the observer's eye does not recognize outer region outside the see-through visual field range SA. However, when the observer moves the line of sight, the observer's eye becomes to recognize the outer region.

To solve the problem, as described above, at least one of the first edge 33 and the second edge 34 is located outside the image display range Lf, and thereby overlapping of the virtual image and the edges can be prevented even if the observer moves the line of sight. Accordingly, the observer can satisfactorily recognize the virtual image and the see-through image even if the observer moves the line of sight to some extent.

Third Embodiment

An image display section according to a third embodiment will be described. The same reference numerals are given to components similar to those in the first embodiment, and their detailed descriptions will be omitted.

In this embodiment, a range (a range in which an external image can be visually recognized) in which the see-through light SL is allowed to enter the eye ME (exit pupil SM) of the observer M is referred to as an effective visual field range. The effective visual field range defines the see-through visual field range more specifically.

Figure 8:
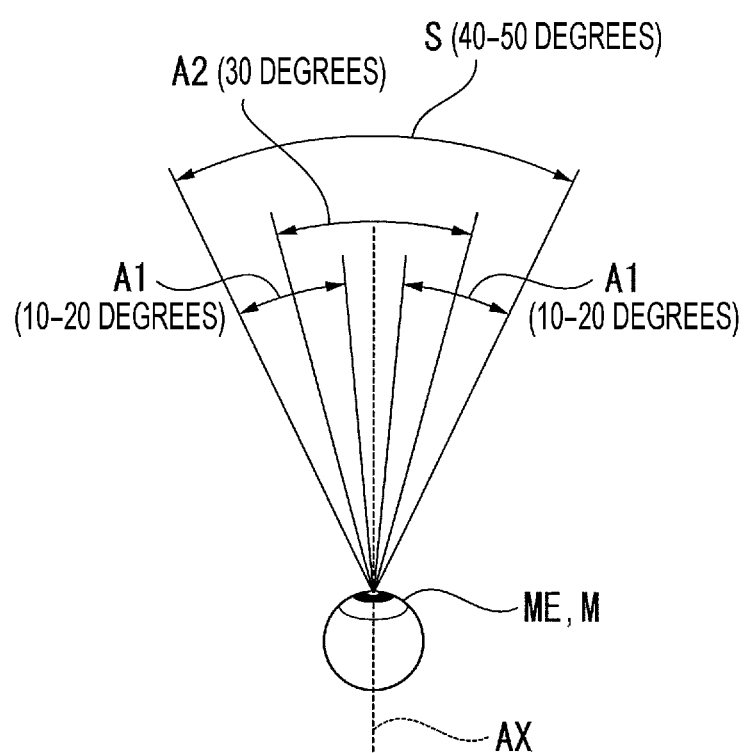
FIG. 8 is a conceptual illustration of an effective visual field range of an image display section according to a third embodiment.

FIG. 8 is a conceptual illustration of an effective visual field range. In FIG. 8, an angle range in which predetermined information such as characters and images can be recognized while the observer M fixes the line of sight of the eye ME (in a state in which the line of sight is not moved) is defined as an information recognition visual field A1, and an angle range in which the observer M can naturally move the line of sight is referred to as a line-of-sight angle moving range A2.

As illustrated in FIG. 8, an effective visual field range S corresponds to an angle range that is defined by the information recognition visual field A1 and the line-of-sight angle moving range A2. In other words, the effective visual field range S corresponds to a field range in which the observer M can naturally (without discomfort) visually recognize predetermined information such as characters and images while moving the line of sight.

Generally, the information recognition visual field A1 is approximately 10 degrees to 20 degrees, and the line-of-sight angle moving range A2 is approximately 30 degrees. Consequently, the effective visual field range S is approximately 40 degrees to 50 degrees.

In the image display apparatus 100 according to the embodiment, the edges (the first edge 33 and the second edge 34) of the light extracting unit 31 are located so as not to be in the effective visual field range, and thereby the observer M can satisfactorily recognize the see-through light SL. In the following description, a positional relationship between the effective visual field range and the edges of the light extracting unit 31 will be described.

Figure 9:
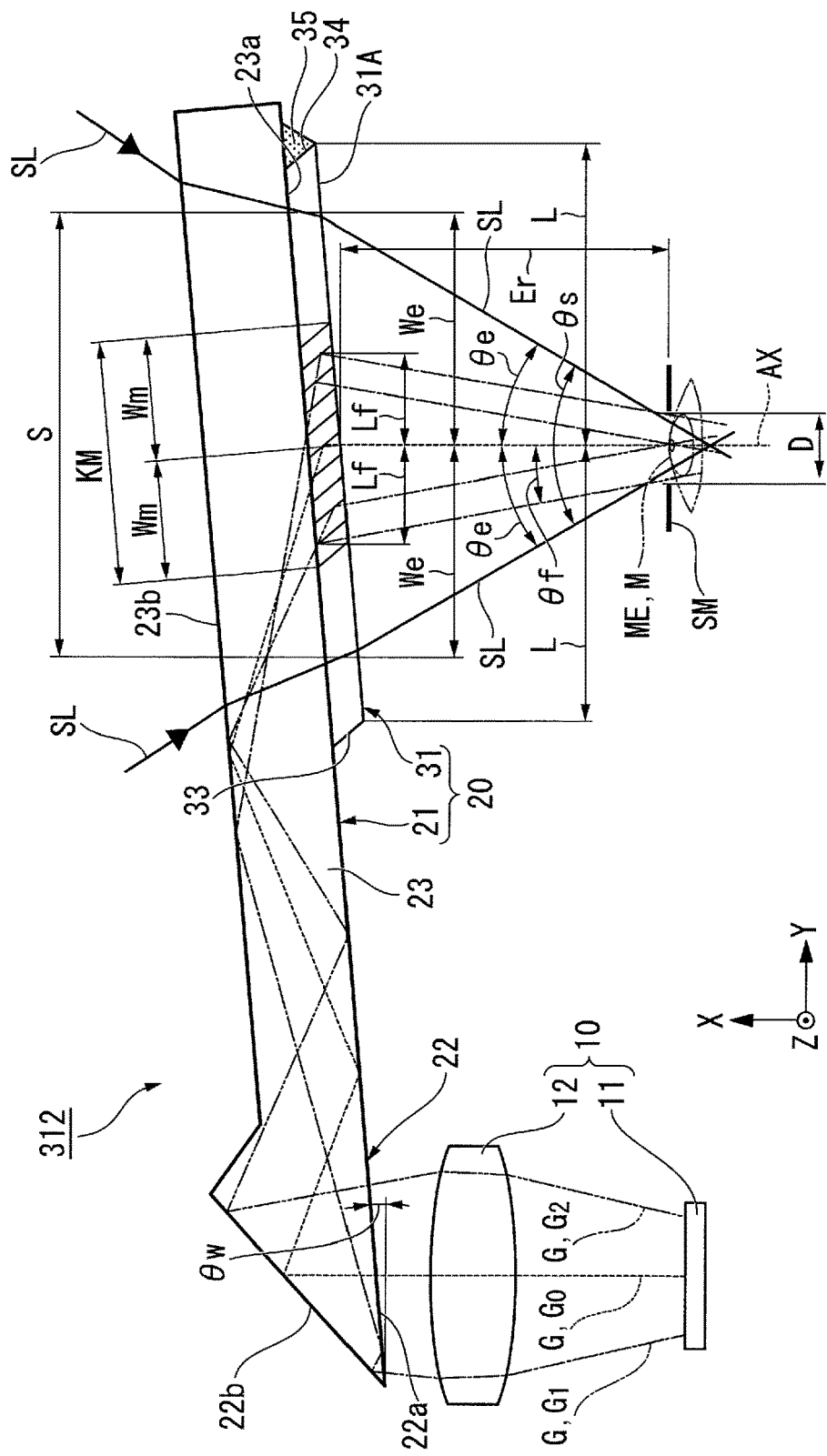
FIG. 9 is a cross-sectional view illustrating a structure of the image display section according to the third embodiment.

FIG. 9 is a cross-sectional view illustrating a structure of an image display section 312 according to the third embodiment. The image display section 312 according to the embodiment is provided with the light extracting unit 31 that is the same as that according to the first embodiment.

In FIG. 9, it is defined that the diameter of the exit pupil SM is D, the distance (eye relief) between the exit pupil SM and the light extracting unit 31 along the optical axis AX is Er, the effective viewing half-angle (the half angle of the effective viewing angle θs that defines the effective visual field range S) is θe, the distance from the optical axis AX to each of the edges (the first edge 33 and the second edge 34) of the light extracting unit 31 is L, the half width (the distance from the optical axis AX to the effective visual field range S) of the effective visual field range S is We, and the image display range that defines the angle of view necessary for displaying the image light G (virtual image) is Lf.

In the light extracting unit 31 according to the embodiment, the following expression (2) that defines a condition that the distance L becomes larger than the effective visual field range S is satisfied.

$$L > We = Er \cdot \tan(\theta e) \qquad \text{expression (2)}.$$

Accordingly, the image display section 312 according to the embodiment enables the edges (the first edge 33 and the second edge 34) of the light extracting unit 31 to be located outside the effective visual field range S.

In this embodiment, it is preferable that the effective viewing half-angle θe be 20 degrees or greater. In other words, it is preferable that the effective viewing angle θs be 40 degrees or greater. The effective viewing angle θs that is set within this range enables the observer M to recognize naturally predetermined information such as characters and images while moving the line of sight and recognize naturally a virtual image formed by the image light G and the see-through light (external image). Accordingly, the observer M can visually recognize images with less discomfort.

Here, it is assumed that the image half angle θf for determining the size of a visible virtual image to be formed by the image light G is 10 degrees, that is, the angle of view is 20 degrees. When the angle of view is set to 20 degrees, the observer M can observe a virtual image of approximately 40 inches in diagonal size 2.5 m in front of the eye ME of the observer M.

Specifically, if the eye relief Er is 20 mm, the half width Wm of the half-mirror formed region KM is approximately 3.5 mm. If the parallel light guide plate 23 is inclined with respect to the eye ME of the observer M, it is necessary to calculate the distance projected in accordance with the inclination angle θw; however, in this embodiment, the inclination angle θw is very small and the influence thereof can be neglected.

If the effective half viewing angle θe is 20 degrees, that is, if the effective viewing angle θs is 40 degrees, the half width We of the effective visual field range S is approximately 7.3 mm. Consequently, in this embodiment, the edges (the first edge 33 and the second edge 34) of the light extracting unit 31 are located at positions separated from the optical axis AX by 7.3 mm or greater.

As described above, in the image display section 312 according to the embodiment, the first edge 33 and the second edge 34 of the light extracting unit 31 are located outside the effective visual field range S. Consequently, the image display apparatus according to the embodiment having the image display section 312 does not restrict the information visibility in the effective visual field range S, since the edges are not located in the effective visual field range S, for example, when the observer M reads predetermined information such as characters and figures from the see-through light.

It should be noted that depending on the layout of the components constituting the image display section 312, both of the first edge 33 and the second edge 34 may not be located outside the effective visual field range S. In such a case, at least one of the first edge 33 and the second edge 34 is located outside the effective visual field range S, and thereby the light extracting unit 31 enables the observer M to visually recognize the see-through light with less distortion.

In this embodiment, the effective visual field range S is wider than the image display range Lf. However, the disclosure is not limited to this embodiment. For example, the angle of view may be larger than 40 degrees depending on the specification of the image display apparatus. When the angle of view is set to 40 degrees, the observer M visually recognizes the image light G as a virtual image of approximately 80 inches 2.5 m in front of the observer M.

When the image display range Lf is wider than the effective visual field range S, if the line of sight of the observer does not move, the observer's eye does not recognize the outer region of the effective visual field range S in the image display range Lf; however, if the observer moves the line of sight, the observer's eye becomes to recognize the outer region. To solve the problem, it is preferable that at least one of the first edge 33 and the second edge 34 be located outside the image display range Lf. With this structure, even if the observer moves the line of sight, overlapping of the edge or edges of the light extracting unit 31 over a virtual image of a large angle of view can be prevented.

Fourth Embodiment

An image display section according to a fourth embodiment will be described. The same reference numerals are given to components similar to those in the first embodiment, and their detailed descriptions will be omitted.

The image display section according to the embodiment enables the observer M to visually recognize images satisfactorily even if the eye ME of the observer M moves to the right or left to some extent.

Figure 10:
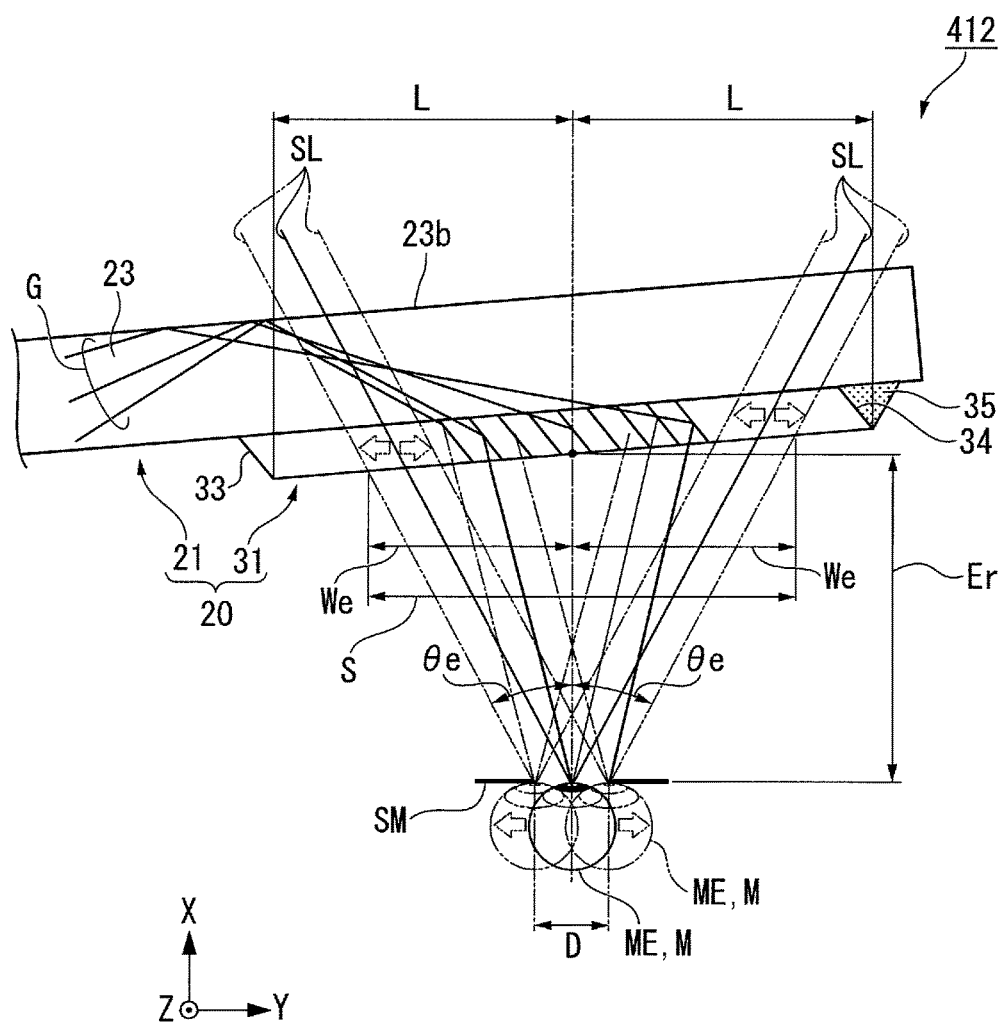
FIG. 10 is a cross-sectional view illustrating a structure of an image display section according to a fourth embodiment.

FIG. 10 is a cross-sectional view illustrating a structure of an image display section 412 according to the fourth embodiment. The image display section 412 according to the embodiment is provided with the same light extracting unit 31 according to the first embodiment. In this embodiment, the following expression (3), which defines a condition for restricting the edges (the first edge 33 and the second edge 34) of the light extracting unit 31 so as not to be in the effective visual field range S even if the eye ME moves by half (D/2) of the diameter D of the exit pupil SM, is satisfied.

$$L > We = Er \cdot \tan(\theta e) + (D/2) \qquad \text{expression (3)}.$$

The image display section 412 according to the embodiment enables the edges (the first edge 33 and the second edge 34) of the light extracting unit 31 to be located outside the effective visual field range S even if the eye ME of the observer M moves to the right or left to some extent.

Fifth Embodiment

Figure 11:
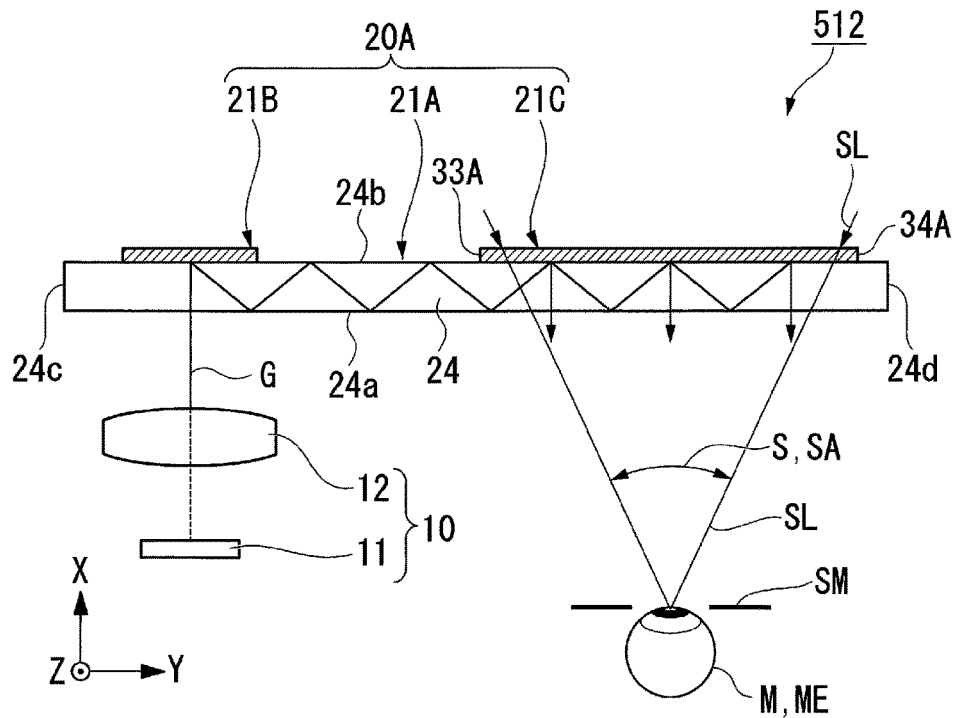
FIG. 11 is a cross-sectional view illustrating a structure of an image display section according to a fifth embodiment.

FIG. 11 is a horizontal sectional view illustrating a schematic structure of an image display section 512 according to the fifth embodiment. The cross section illustrated in FIG. 11 is parallel to the XY plane. The same reference numerals are given to components similar to those in the first embodiment, and their detailed descriptions will be omitted.

As illustrated in FIG. 11, the image display section 512 includes the image forming section 10 and a light guide section 20A. The light guide section 20A includes a light guide member 21A, a light incident section 21B, and a light extracting unit 21C.

The light guide member 21A has a plate-like parallel light guide plate 24 that extends in the left-right direction (Y direction in which both eyes are positioned) of the observer M. The parallel light guide plate 24 has a pair of parallel first plane 24a and second plane 24b. Since the first plane 24a and the second plane 24b are parallel planes, no magnification or focus deviation is produced with respect to an external image. The first plane 24a and the second plane 24b function as total reflection planes that totally reflect the image light G that is transmitted inside the parallel light guide plate 24 and are designed to guide the image light G to the light extracting unit 21C with less loss.

The light incident section 21B allows the image light G to enter the light guide member 21A, and the light extracting unit 21C extracts the image light G that has been guided in the light guide member 21A to the outside. The light incident section 21B and the light extracting unit 21C are provided on the second plane 24b of the parallel light guide plate 24. The light incident section 21B and the light extracting unit 21C are plate-like diffractive optical elements that extend along the second plane 24b of the parallel light guide plate 24 in the Y direction. For example, if surface-relief diffraction gratings are used, high diffraction efficiency can be maintained over a wide range of incident angles.

With such a structure, the image light G that has entered from the side of the first plane 24a of the parallel light guide plate 24 is reflected by the light incident section 21B provided on the second plane 24b. Then, the image light G is directed onto the first plane 24a and is totally reflected. The image light G is totally reflected one or more times between the first plane 24a and the second plane 24b in the direction separating from the light incident section 21B and reaches the light extracting unit 21C.

The light extracting unit 21C extracts the image light G that has passed through the parallel light guide plate 24 toward the exit pupil SM. The light extracting unit 21C has a first edge 33A and a second edge 34A at both sides in the left-right direction. The first edge 33A is an end portion on the −Y side and the second edge 34A is an end portion on the +Y side.

In the image display section 512 according to the embodiment, the edges (the first edge 33A and the second edge 34A) of the light extracting unit 21C are located so as not to be in the see-through visual field range or the effective visual field range. Furthermore, an end plane 24d, which corresponds to an end portion on the opposite side of an end portion (end plane 24c) on the side of the light incident section 21B on the parallel light guide plate 24, is designed so as not to be located in the see-through visual field range SA or the effective visual field range S. The image display apparatus including such an image display section 512 enables the observer M to visually recognize the see-through light SL (external image) without distortion.

According to the embodiment, the light incident section 21B and the light extracting unit 21C are diffractive optical elements, and the image light G can be effectively extracted by using diffraction of light.

Sixth Embodiment

Figure 12:
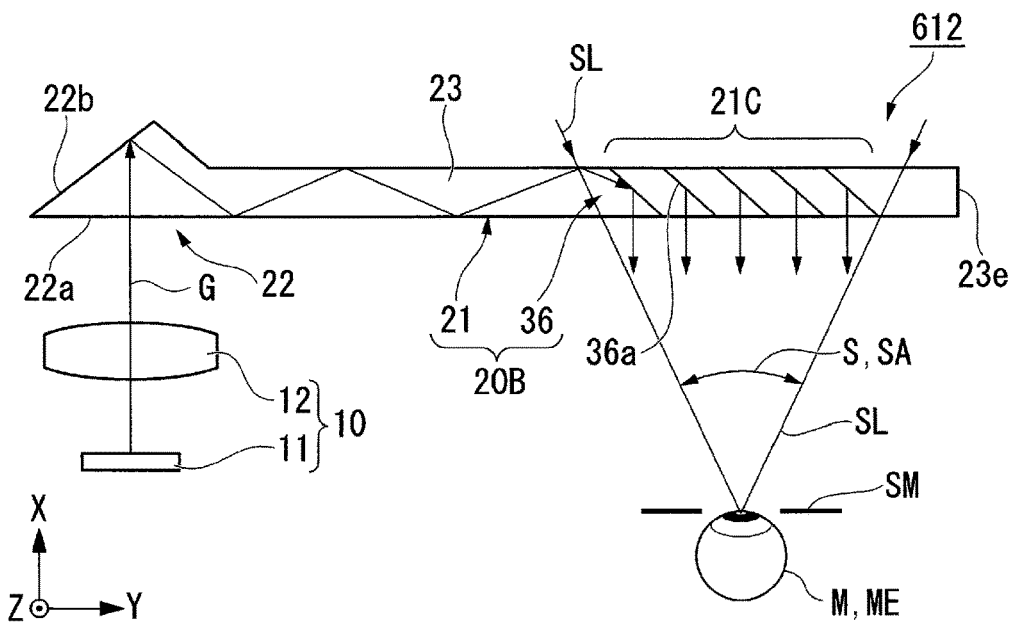
FIG. 12 is a cross-sectional view illustrating a structure of an image display section according to a sixth embodiment.

FIG. 12 is a horizontal sectional view illustrating a schematic structure of an image display section 612 according to the sixth embodiment. The cross section illustrated in FIG. 12 is parallel to the XY plane. In this embodiment, the same reference numerals are given to components similar to those in the first embodiment, and their detailed descriptions will be omitted.

As illustrated in FIG. 12, the image display section 612 includes the image forming section 10 and a light guide section 20B. The light guide section 20B includes the light guide member 21, the light incident section 22, and a light extracting unit 36 that extracts the image light G that has been guided in the light guide member 21 to the outside.

In this embodiment, the light extracting unit 36 is provided in the parallel light guide plate 23 in the light guide member 21 and is used to extract the image light G that has passed through in the parallel light guide plate 23 toward the exit pupil SM. The light extracting unit 36 includes a plurality of half mirrors 36a that are embedded in the parallel light guide plate 23.

In the image display section 612 according to the embodiment, an end plane 23e, which corresponds to an end portion on the opposite side of the light incident section 22 of the parallel light guide plate 23, is designed so as not to be located in the see-through visual field range SA or the effective visual field range S. The image display apparatus including such an image display section 612 enables the observer M to visually recognize the see-through light SL (external image) without distortion.

The entire disclosure of Japanese Patent Application No.: 2016-189255, filed Sep. 28, 2016 and 2016-255069, filed Dec. 28, 2016 are expressly incorporated by reference herein.

What is claimed is:

1. An image display apparatus comprising:
   an image display device configured to emit image light;
   a light guide member having a first plane and a second plane opposite to the first plane;
   a projection lens configured to project the image light toward a light incident section of the light guide member; and
   a light extracting unit provided on the first plane or the second plane of the light guide member, the light extracting unit being configured to extract the image light guided in the light guide member toward an exit pupil located on the first plane side of the light guide member,
   wherein the light extracting unit includes a first edge located at an end portion of the light extracting unit on the light incident section side and a second edge located at an end portion on the opposite side of the light incident section side, and is capable of transmitting see-through light having been transmitted in the light guide member from the second plane side to the first plane side toward the exit pupil, and
   at least one of the first edge and the second edge is located outside a see-through visual field range in which the see-through light passes through, wherein
   if a diameter of the exit pupil is D, a distance from the exit pupil to the light extracting unit is Er, a see-through viewing half-angle defining an angle formed by an optical axis passing through a center of the exit pupil and see-through visual field range is θs, and a distance from the optical axis to the first edge or the second edge is L, $L > Er \cdot \tan(\theta s) + D/2$ is satisfied.

2. An image display apparatus comprising:
   an image display device configured to emit image light;
   a light guide member having a first plane and a second plane opposite to the first plane;
   a projection lens configured to project the image light toward a light incident section of the light guide member; and
   a light extracting unit provided on the first plane or the second plane of the light guide member, the light extracting unit being configured to extract the image light guided in the light guide member toward an exit pupil located on the first plane side of the light guide member,
   wherein the light extracting unit includes a first edge located at an end portion of the light extracting unit on the light incident section side and a second edge located at an end portion on the opposite side of the light incident section side, and is capable of transmitting see-through light having been transmitted in the light guide member from the second plane side to the first plane side toward the exit pupil, and at least one of the first edge and the second edge is located outside a see-through visual field range in which the see-through light passes through, wherein the see-through visual field range is an effective visual field range enabling an observer to recognize at least the see-through light while moving a line of sight, and wherein an effective viewing half-angle that defines an angle to be formed by an optical axis passing through a center of the exit pupil and the effective visual field range is set to 20 degrees or greater.

3. The image display apparatus according to claim 1, wherein the see-though viewing half-angle is set to 30 degrees or greater.

4. The image display apparatus according to claim 1, wherein the light extracting unit is provided with a half mirror array including a plurality of half mirrors, and the half mirrors are disposed such that individual inclination angles with respect to the first plane or the second plane of the light guide member are substantially the same.

5. The image display apparatus according to claim 4, wherein the light extracting unit has a dummy region in which the half mirrors are not provided between the first edge or the second edge and the half mirror array.

6. The image display apparatus according to claim 4, wherein the half mirror array is formed such that the first edge, the second edge, and the half mirrors are parallel to each other.

7. The image display apparatus according to claim 1, wherein the first edge is provided in a forward tapered state and the second edge is provided in a reverse tapered state with respect to the first plane or the second plane of the light guide member.

8. The image display apparatus according to claim 7, wherein a resin is filled between the second edge and the first plane or the second plane of the light guide member.

9. The image display apparatus according to claim 1, wherein the light extracting unit is a diffractive optical element.

10. An image display apparatus comprising:
an image display device configured to emit image light;
a light guide member having a first plane and a second plane opposite to the first plane;
a projection lens configured to project the image light toward a light incident section of the light guide member; and
a light extracting unit provided on the light guide member, the light extracting unit being configured to extract the image light guided in the light guide member toward an exit pupil located on the side of one of the planes of the light guide member,
wherein the light guide member has an end plane located at an end portion on the opposite side of the light incident section side,
the light extracting unit is capable of transmitting see-through light having been transmitted in the light guide member from the second plane side to the first plane side toward the exit pupil, and
the end plane of the light guide member is located outside the see-through visual field range in which the see-through light passes through, wherein if a diameter of the exit pupil is D, a distance from the exit pupil to the light extracting unit is Er, a see-though viewing half-angle defining an angle formed by an optical axis passing through a center of the exit pupil and the see-through visual field range is $\theta s$, and a distance from the optical axis to the first edge or the second edge is L, $L > Er \cdot \tan(\theta s) + _D/2$ is satisfied.

11. The image display apparatus according to claim 2, wherein the light extracting unit is provided on the first plane of the light guide member.

12. The image display apparatus according to claim 2, wherein when an image display range defining an angle of view for guiding the image light toward the exit pupil is wider than the effective visual field range, at least one of the first edge and the second edge is located outside the image display range.

13. The image display apparatus according to claim 2, wherein the light extracting unit is provided with a half mirror array including a plurality of half mirrors, and the half mirrors are disposed such that individual inclination angles with respect to the first plane or the second plane of the light guide member are substantially the same.

14. The image display apparatus according to claim 13, wherein the light extracting unit has a dummy region in which the half mirrors are not provided between the first edge or the second edge and the half mirror array.

15. The image display apparatus according to claim 13, wherein the half mirror array is formed such that the first edge, the second edge, and the half mirrors are parallel to each other.

16. The image display apparatus according to claim 2, wherein the light extracting unit is a diffractive optical element.

17. An image display apparatus comprising:
an image display device configured to emit image light;
a light guide member having a first plane and a second plane opposite to the first plane;
a projection lens configured to project the image light toward a light incident section of the light guide member; and
a light extracting unit provided on the light guide member, the light extracting unit being configured to extract the image light guided in the light guide member toward an exit pupil located on the side of one of the planes of the light guide member,
wherein the light guide member has an end plane located at an end portion on the opposite side of the light incident section side,
the light extracting unit is capable of transmitting see-through light having been transmitted in the light guide member from the second plane side to the first plane side toward the exit pupil, and
the end plane of the light guide member is located outside the see-through visual field range in which the see-through light passes through,
wherein the see-through visual field range is an effective visual field range enabling an observer to recognize at least the see-through light while moving a line of sight, and
wherein an effective viewing half-angle that defines an angle to be formed by an optical axis passing through a center of the exit pupil and the effective visual field range is set to 20 degrees or greater.

* * * * *